Aug. 3, 1965 H. L. JOHNSON ETAL 3,198,088
FLUID MOTOR CONTROL SYSTEM
Filed Aug. 13, 1963
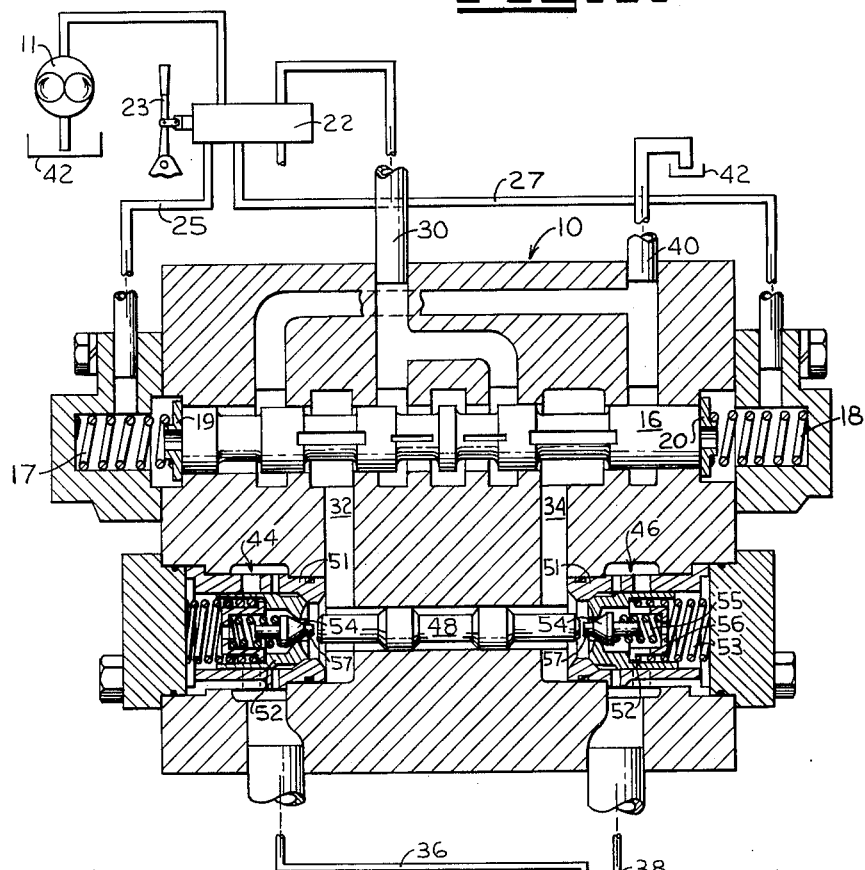
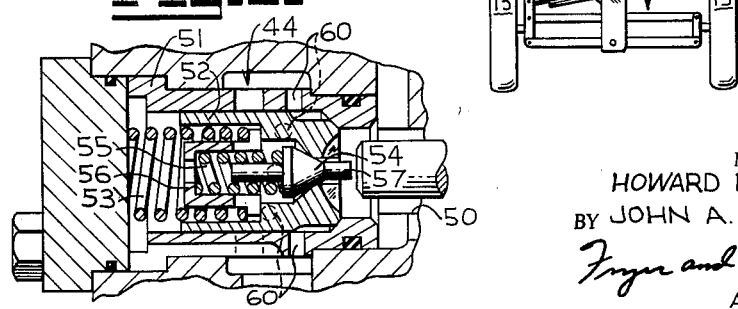
INVENTOR.
HOWARD L. JOHNSON
BY JOHN A. JUNCK
ATTORNEYS 3,198,088
FLUID MOTOR CONTROL SYSTEM
Howard L. Johnson and John A. Junck, Joliet, Ill., assignors to Caterpillar Tractor Co., Peoria, Ill., a corporation of California
Filed Aug. 13, 1963, Ser. No. 301,847
6 Claims. (Cl. 91—420)

This invention relates to the control of fluid motors such as hydraulic jacks and particularly to the operation of check valves which prevent leakage of fluid from the jacks under influence of external pressure or forces acting on the jacks through a component controlled thereby.

Many hydraulic systems employed for example in earthmoving and agricultural machines employ double acting hydraulic jacks for adjusting machine components. The jacks are usually controlled by spool-type valves employed to direct fluid under pressure to either end of the jack cylinder selectively and simultaneously to vent the opposite end to permit return of fluid therefrom to a source. Spool valves are known to leak particularly after wear has taken place and it has become common practice of some manufacturers to employ the more dependable poppet-type check valves to retain the fluid in both ends of a hydraulic jack.

Many hydraulically controlled machine components are subjected to external forces, one good example, and that which will be used illustratively in describing the present invention is the wheel lean control of a motor grader in which forces are encountered which tend to move the wheels in either direction from the position in which they are held and, therefore, tend to eject fluid from the cylinder of the controlling jack.

It is an object of the present invention to provide an improved check valve system for use with fluid motors of the kind described and to provide pressure breaker valve means associated with the check valves in a manner to insure a sequence of valve operation to effect positive and smooth functioning of the system.

Further objects and advantages of the invention and the manner in which it is carried into practice are made apparent in the following specification wherein reference is made to the accompanying drawing.

In the drawing:

FIG. 1 is a view in cross section of a control valve embodying the present invention with the fluid circuit and hydraulic jack controlled thereby illustrated schematically; and FIG. 2 is an enlarged fragmentary view illustrating parts of one of the check valve systems used in the controls and embodying the present invention.

In FIG. 1 of the drawing, a spool-type valve, generally indicated at 10, is illustrated as controlling or directing the flow of fluid under pressure from a pump 11 to either end of a hydraulic jack 12 employed for imparting leaning movement to wheels 13 of a motor grader or the like through linkage, generally indicated at 14, in a well known manner. The valve 10 has a sliding spool 16, normally held in a central or neutral position, by springs 17 and 18 bearing against the opposite end of the spool through washers 19 and 20, respectively, which abut shoulders in the spring chambers to limit the movement of the spool in either direction.

Pressure from the pump 11 is employed to move the valve spool in either direction through a power control valve 22 of conventional type which is adjustable through a lever 23 to direct pressure to the chamber of spring 17 through a line 25 or to the chamber of spring 18 through a line 27. This serves through the conventional configuration of the spool illustrated to direct fluid under pressure from an inlet line 30 selectively to passages 32 and 34 and to opposite ends of the jacks 12 through lines 36 and 38 which communicate with opposite ends of the jack 18. While pressure is directed to either end of the jack the opposite end will be vented back through the passage 32 or 34 and return line 40 to a sump 42 which is the same sump that supplies fluid to the intake of pump 11.

Interposed between the passage 32 and line 36 which lead to the rod end of the jack and between the passage 34 and line 38 which lead to the head end of the jack are identical check valve assemblies, generally indicated at 44 and 46. These check valve assemblies include valve elements of the poppet type to positively prevent return flow from either end of the jack as the result of forces acting upon the wheels 13. The pressure of fluid in either of the lines 32 or 34 which is admitted by actuation of the spool valve 10 will open its associated check valve system and while this pressure exists will effect opening of the opposite check valve system to permit return flow from the opposite end of the jack through the medium of a common or double ended piston 48 in a bore 50 which extends between the two check valve systems.

Each check valve system comprises, as best shown in FIG. 2, a check valve cylinder 51 with a valve element 52 slidable therein and urged to its closed position by a spring 53. Each of the valve elements contains a small pressure breaker valve 54 controlling an opening in the face of the valve element and urged toward its closed position by a smaller spring 55 retained in a cage 56 within the main valve element.

In accordance with the present invention, the sizes of the check valve, the pressure breaker valve as well as the force imparted by their springs and the size of the common piston 48 are related in the manner to cause a sequence of operation which insures against undesirable pressure surges and erratic pressure fluctuation to produce smooth and well controlled operation of the valve and jack.

Assuming that the spool valve 16 is adjusted toward the right as viewed in FIG. 1, pressure is admitted to passage 32 to be directed to the rod end of the jack while passage 34 will be vented to the sump through line 40. At this point, the jack has been locked against movement in either direction by the check valve assemblies because fluid in the head end of the jack cannot escape to permit fluid to enter the rod end. However initial and relatively low pressure in the passage 32 acts on the piston 48 to move it toward the right where it engages an extension 57 on the pressure breaker valve 54 of the check valve assembly 46. This permits limited return flow from the jack to the sump and pressure building up in the passage 32 becomes great enough to open the main check valve in the check valve assembly 44 and admit fluid to the rod end of the jack. Pressure will continue to build up in the passage 32 due to the restriction of flow through the return line until it becomes sufficient, acting upon the piston 48, to cause abutment of the piston with the main check valve in assembly 46 to open this valve for greater return flow. The return flow is, however, modulated by a series of spirally arranged modulating orifices 60 in the valve cylinder which serve to modulate return flow in accordance with pressure directed to the jack, thus insuring against cavitation in the pressurized end of the jack which might result from external forces acting upon the controlled component such as the wheels 13.

We claim:
1. A control system for a double acting hydraulic jack comprising a valve for directing fluid under pressure to either end of the jack and venting the opposite end, a pair of aligned and opposed check valves normally closed to prevent flow from both ends of the jacks, a normally spring closed pressure breaker valve smaller than and disposed in each check valve, a spring for each check valve and a separate spring for each pressure breaker valve independent of the check valve spring, a cylinder containing a piston movable in opposite directions to engage and open one or the other of said pressure breaker valves, and means to communicate pressure directed to either end of the jack to one end of said piston to cause it to open the pressure breaker valve associated with the opposite end of the jack, the cross sectional area of said piston being greater than the pressure breaker valves and less than the check valves.

2. The combination of claim 1 in which each pressure breaker valve is contained in one of the check valves and has a part engageable by the piston extending beyond the check valve whereby the piston will first open the pressure breaker valve and upon continued movement open the check valve.

3. The combination of claim 2 in which the check valve springs are stronger than the pressure breaker valve springs.

4. The combination of claim 3 in which the faces of the check valves exposed to opening pressure are larger than the cross section of the piston whereby the check valve subjected to direct pressure will open before the check valve actuated by the piston.

5. The combination of claim 4 in which the size of the pressure breaker valve and the force of its spring are sufficiently small to cause it to open before either of the check valves.

6. The combination of claim 2 with means to modulate the flow of fluid through the check valve at the end of the jack which is vented.

References Cited by the Examiner
UNITED STATES PATENTS

| | | | |
|---|---|---|---|
| 2,389,654 | 11/44 | Werff | 91—420 |
| 2,691,964 | 10/54 | Stickney | 91—420 |
| 3,032,063 | 5/62 | Wells | 137—630.15 |
| 3,145,734 | 8/64 | Lee | 91—420 |

FRED E. ENGELTHALER, *Primary Examiner.*